(12) United States Patent
Seaman et al.

(10) Patent No.: US 11,772,582 B2
(45) Date of Patent: Oct. 3, 2023

(54) ROUTING ASSEMBLY FOR ROUTING ELECTRICAL CONNECTIONS

(71) Applicant: Caterpillar Inc., Peoria, IL (US)

(72) Inventors: Codey Ryan Seaman, Washington, IL (US); Benjamin Thomas Nelson, Dunlap, IL (US); Jacob Andrew Scheirer, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 46 days.

(21) Appl. No.: 17/453,030

(22) Filed: Nov. 1, 2021

(65) Prior Publication Data

US 2023/0133130 A1 May 4, 2023

(51) Int. Cl.
*H02G 3/04* (2006.01)
*B60R 16/02* (2006.01)

(52) U.S. Cl.
CPC ....... *B60R 16/0222* (2013.01); *H02G 3/0437* (2013.01); *H02G 3/0462* (2013.01)

(58) Field of Classification Search
None
See application file for complete search history.

(56) References Cited

U.S. PATENT DOCUMENTS

| | | | |
|---|---|---|---|
| 3,899,046 A | 8/1975 | Hansen | |
| 6,423,897 B1 * | 7/2002 | Roesch | H02G 3/086 174/53 |
| 7,273,986 B2 | 9/2007 | Fuller et al. | |
| 8,108,968 B2 | 2/2012 | Pietryga et al. | |
| 8,178,795 B2 | 5/2012 | Roy | |
| 8,563,878 B2 | 10/2013 | Suzuki | |
| 8,785,772 B2 * | 7/2014 | Ohmori | H02S 40/34 361/600 |
| 8,895,852 B2 * | 11/2014 | Sella | H01R 13/6641 361/679.01 |
| 8,907,212 B2 * | 12/2014 | Xiao | H01L 31/04 361/600 |
| 2015/0136437 A1 * | 5/2015 | Hitchman | E04F 21/0076 174/54 |
| 2015/0357805 A1 * | 12/2015 | Dias | H05K 5/0247 174/535 |

FOREIGN PATENT DOCUMENTS

| | | |
|---|---|---|
| DE | 29922040 | 3/2000 |
| JP | 2004222471 | 8/2004 |

* cited by examiner

Primary Examiner — Krystal Robinson

(57) ABSTRACT

A routing assembly for routing an electrical connection between two or more sub-systems in a work machine includes a hose, a coupling member, a wiring harness, and a grommet. The hose defines a conduit. The coupling member defines a through-bore fluidly coupled with the conduit. The wiring harness facilitates passage of one or more electrical wirings through each of the conduit and the through-bore to enable electrical communication between the two or more sub-systems. The grommet is retentively engaged with the coupling member and the wiring harness respectively with a first force and a second force. The first force is greater than the second force facilitating a movement of the wiring harness with respect to the grommet without disengaging the grommet from the coupling member.

20 Claims, 3 Drawing Sheets

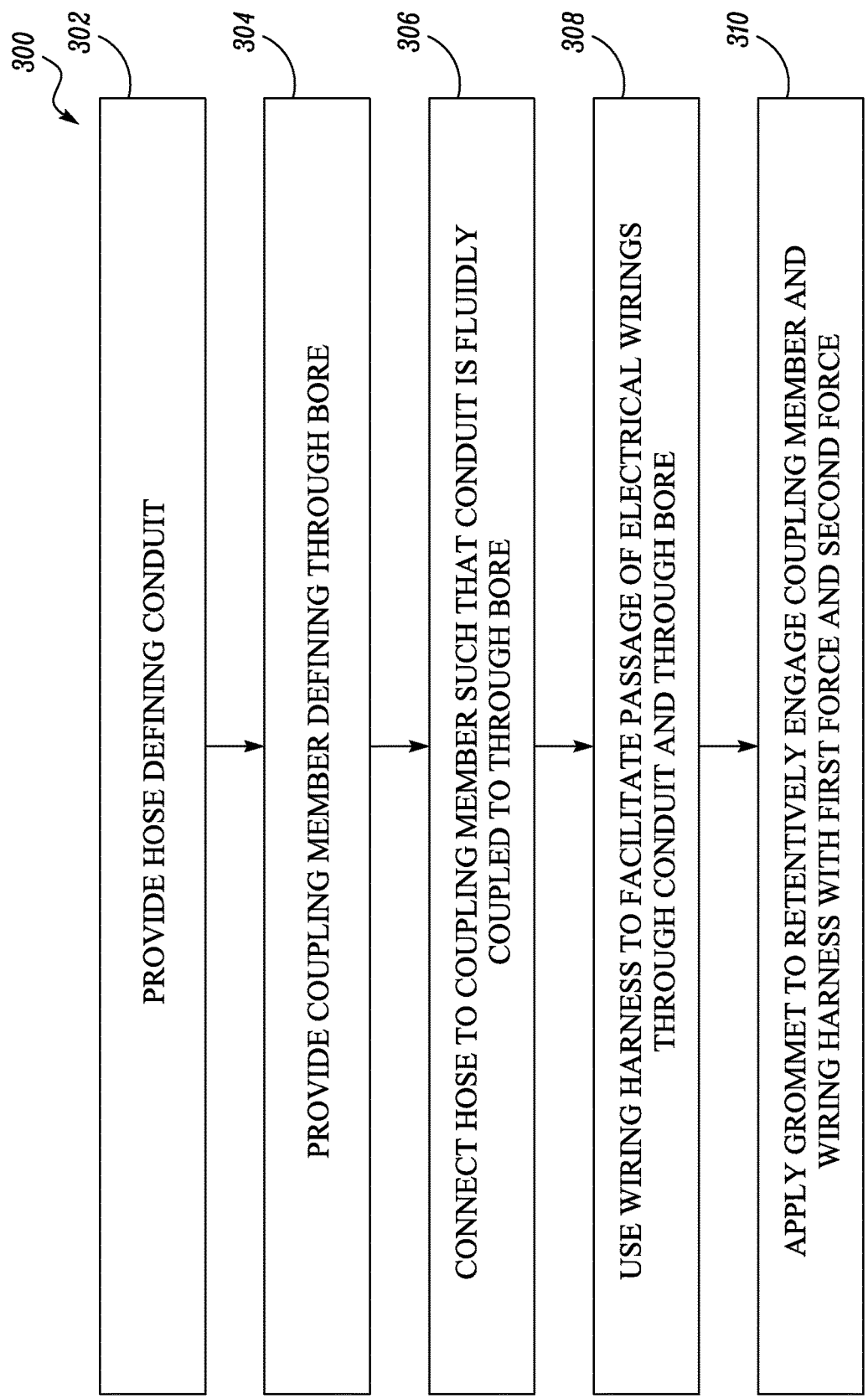

ROUTING ASSEMBLY FOR ROUTING ELECTRICAL CONNECTIONS

TECHNICAL FIELD

The present disclosure relates to a routing assembly for routing electrical connections in a work machine. More particularly, the present disclosure relates to a wiring harness passing through a hose assembly and which is movable with respect to the hose assembly as flexures are induced in the hose assembly.

BACKGROUND

Work machines, such as track type tractors, excavators, loaders, and the like, are commonly applied for earth moving operations at various worksites. To accomplish such operations, work machines often require several of their sub-systems to work collectively and concertedly. Examples of such sub-systems may include systems for actuating the work machine's implements, systems to monitor and control the work machine's functions, systems to supply power to execute the aforesaid functions, and the like. To this end, it is common for such sub-systems to be operably and suitably connected to each other by way of an electrical connection that may include electrical wirings.

Work machines typically operate in harsh terrains. Therefore, an electrical connection may be routed through a cover or sheath so as to protect the electrical connection from external elements, such as dust, fluids, and the like. In this regard, it is a common practice to securely couple the cover or sheath with the electrical connection, e.g., at locations where the electrical connection may enter and/or exit the cover or sheath. Given such a coupling, however, if the cover or sheath were subjected to stresses (e.g., significant twisting and/or bending forces), said stresses may be unduly passed to the electrical connection as well, potentially shortening the electrical connection's usable life.

U.S. Pat. No. 8,563,878 relates to a grommet of which a first diameter tubular section can extend smoothly in response to displacement of a wire harness inserted closely in the first diameter tubular section when the wire harness is pushed into a through-hole in a vehicle body panel.

SUMMARY OF THE INVENTION

A routing assembly for routing an electrical connection between two or more sub-systems in a work machine. The routing assembly includes a hose, a coupling member, a wiring harness, and a grommet. The hose defines a conduit. The coupling member defines a through-bore fluidly coupled with the conduit. The wiring harness facilitates passage of one or more electrical wirings through each of the conduit and the through-bore to enable electrical communication between the two or more sub-systems. The grommet is retentively engaged with the coupling member and the wiring harness respectively with a first force and a second force. The first force is greater than the second force facilitating a movement of the wiring harness with respect to the grommet without disengaging the grommet from the coupling member.

In another aspect, the disclosure is directed to a work machine. The work machine includes a number of sub-systems and a routing assembly for routing an electrical connection between two or more sub-systems of the plurality of sub-systems. The routing assembly includes a hose, a coupling member, a wiring harness, and a grommet. The hose defines a conduit. The coupling member defines a through-bore fluidly coupled with the conduit. The wiring harness facilitates passage of one or more electrical wirings through each of the conduit and the through-bore to enable electrical communication between the two or more sub-systems. The grommet is retentively engaged with the coupling member and the wiring harness respectively with a first force and a second force. The first force is greater than the second force facilitating a movement of the wiring harness with respect to the grommet without disengaging the grommet from the coupling member.

In yet another aspect, the disclosure relates to a method for routing an electrical connection between two or more sub-systems in a work machine. The method includes providing a hose defining a conduit; providing a coupling member defining a through-bore; connecting the hose to the coupling member such that the conduit is fluidly coupled to the through-bore; using a wiring harness to facilitate passage of one or more electrical wirings through each of the conduit and the through-bore to enable electrical communication between the two or more sub-systems; and applying a grommet to retentively engage with the coupling member and with the wiring harness respectively with a first force and a second force. The first force is greater than the second force facilitating a movement of the wiring harness with respect to the grommet without disengaging the grommet from the coupling member.

BRIEF DESCRIPTION OF THE DRAWINGS

FIG. 3 is a flowchart illustrating a method for routing the electrical connection between two or more sub-systems in the work machine, in accordance with one or more aspects of the present disclosure.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

Figure 1:
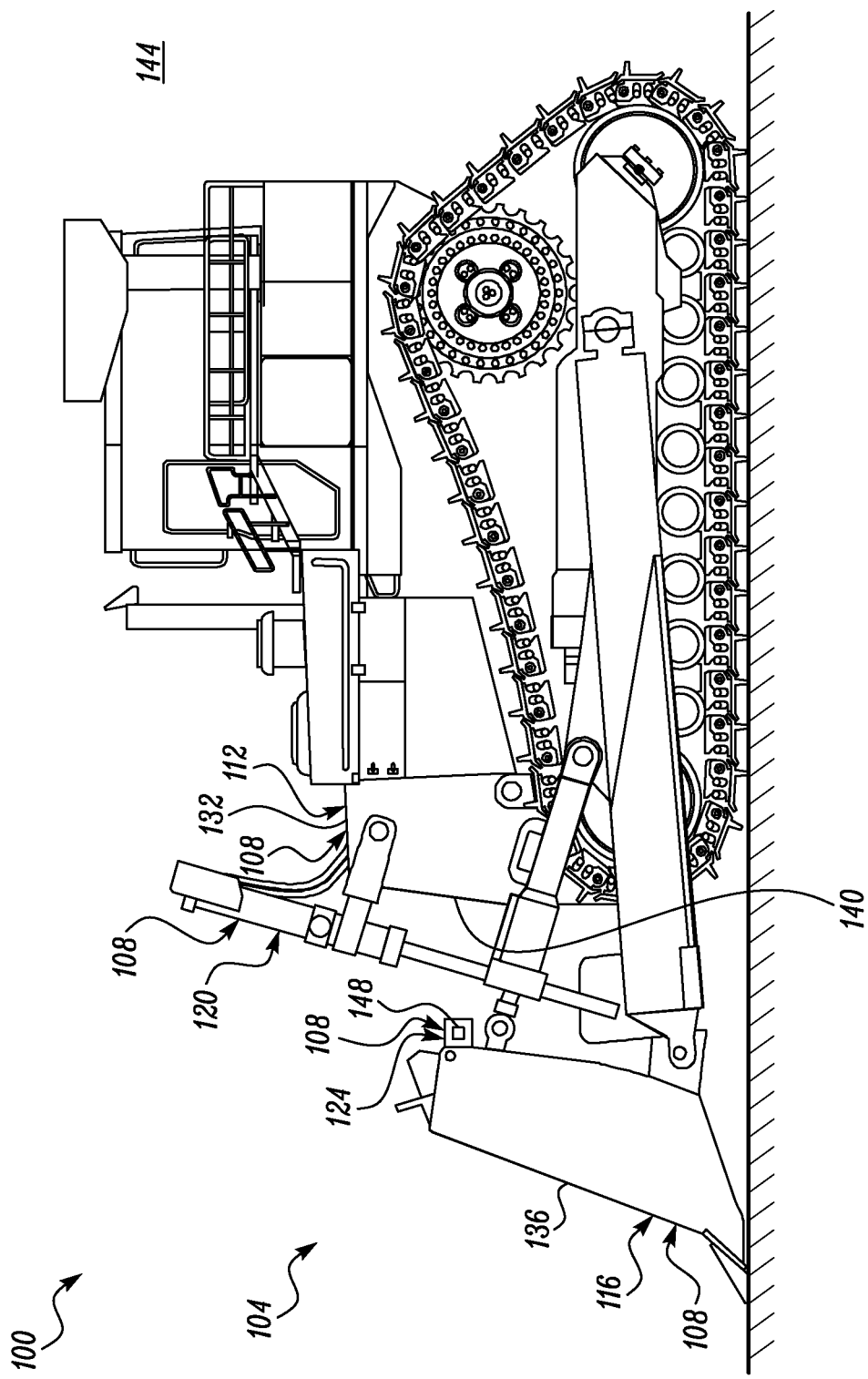
FIG. 1 is a side view of an exemplary work machine that includes a number of sub-systems, in accordance with one or more aspects of the present disclosure.
Figure 2:
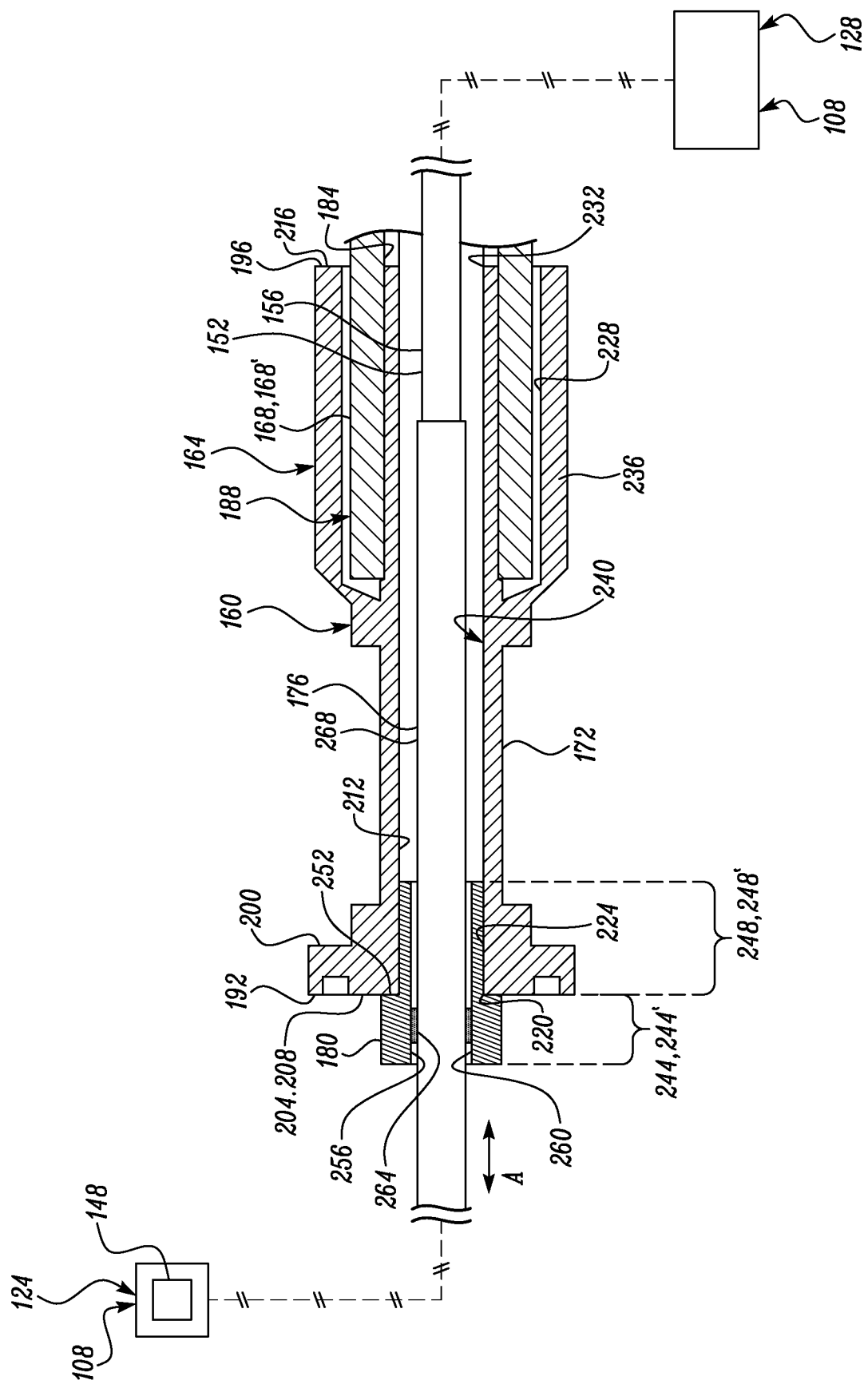
FIG. 2 is a cross-sectional view of a routing assembly for routing electrical connections in the work machine, in accordance with one or more aspects of the present disclosure.

Referring to FIGS. 1 and 2, a work machine 100 is disclosed. The work machine 100 may be a construction machine 104, such as a track type tractor. However, aspects of the present disclosure may be applicable to several other types of machines, such as excavators, shovels, loaders, off-highway trucks, and the like, and said applicability to other machines will become apparent by way of the discussions below. The work machine 100 embodying the track type tractor is purely exemplary.

The work machine 100 may include multiple sub-systems 108. For example, the work machine 100 may include a power system 112, an implement system 116, an actuation system 120, a sensing system 124, a control system 128, and the like. For example, the power system 112 may include a power source (e.g., an internal combustion engine and/or an electrical power generation unit) housed within a power compartment 132. The implement system 116 may include an implement 136 (e.g., a bucket or a moldboard) movably coupled to a frame 140 of the work machine 100. The actuation system 120 (e.g., including hydraulic and/or electrical actuators) may source power from the power system 112 to accomplish an actuation (e.g., panning, titling) of the implement 136 of the implement system 116. The implement 136 may be in turn used to perform functions, such as moving (e.g., pushing) earth from one location to another location at a worksite 144. Further, the sensing system 124 and the control system 128 may be combinedly applied for monitoring and controlling the actuation and/or working of the implement 136. The work machine 100 may include several other such sub-systems as well, but which are not discussed in the present disclosure, for brevity.

As noted above, one or more of these sub-systems 108 may work collectively and concertedly with the other so as to execute one or more functions of the work machine 100. For example, the sensing system 124 and the control system 128 may work in concert with each other so as to control the actuation system 120 and help move and/or maintain the implement 136 in a predetermined orientation with respect to the frame 140, during a work cycle. According to an exemplary scenario, the sensing system 124 may include a sensor 148 (e.g., an inertial measurement unit, IMU) coupled to a portion of the implement 136, and the control system 128 may be operably coupled to such the sensor 148 so as to receive signals from the sensor 148. A control of the implement 136 may be performed by the control system 128 by controlling the actuation system 120 once signals from the sensor 148 are received by the control system 128. In this regard, a communication (e.g., an electrical signal communication) between the sub-systems 108, e.g., between the control system 128 and the sensing system 124 and/or between the control system 128 and the actuation system 120, may be attained by one or more electrical connections (e.g., physical, hard wired, electrical connection, such as an electrical connection 152) (see FIG. 2) that may extend therebetween. Said electrical connection 152 may include one or more electrical wirings 156.

Given the multiple sub-systems 108 of the work machine 100, there may exist several such electrical connections between the various sub-systems 108 of the work machine 100. However, only one electrical connection (i.e., electrical connection 152) is discussed, and aspects discussed for the same may be applied to one or more of the other electrical connections of the work machine 100. Although an electrical communication between two or more sub-systems 108 may involve electrical signal communication, as noted above, such an electrical connection may additionally or optionally also facilitate a supply of electrical power therethrough.

Referring to FIG. 2, an aspect of the present disclosure relates to a routing assembly 160 for routing (or providing passage to) the electrical connection 152 between the two or more sub-systems 108 of the work machine 100 (e.g., between the sensing system 124 and the control system 128, FIG. 2). The routing assembly 160 includes a hose assembly 164 having a hose 168 and a coupling member 172, as shown. Further, the routing assembly 160 includes a wiring harness 176 and a grommet 180. Details related to the routing assembly 160 shall now be discussed below.

The hose 168 may define an elongated structure and may define a conduit 184 that may extend throughout a length of the hose 168 so as to be open to each end of the hose 168 (only one of the end, i.e., an end 188, is shown in FIG. 2). Further, the hose 168 may include a hydraulic hose 168', and may be one that may be capable of supplying hydraulic fluid for hydraulic actuation. Aspects of the present disclosure however relate to applications of the hose 168 not necessarily involving the passage or flow of fluid (e.g., hydraulic fluid) therethrough. The hose 168 may be generally flexible, alike conventional hydraulic hoses, but may be rigid enough to withstand certain external forces (e.g., twisting and/or bending forces) that the hose 168 may be subjected to during an application of the routing assembly 160 and/or an operation of the work machine 100.

The coupling member 172 may include an elongated profile, and may define a first end 192 and a second end 196 opposed to the first end 192. The first end 192 may define a flange structure 200 having an end face 204 (e.g., a first end face 208). Further, the coupling member 172 may define a through-bore 212 extending from the first end face 208 all the way to a second end face 216 defined at the second end 196. The coupling member 172 may be assembled and coupled to the hose 168 so as to have the through-bore 212 and the conduit 184 fluidly coupled with each other. The through-bore 212 may be open to the first end face 208 at a first opening 220 and may define an inner coupling surface 224 extending from the first end face 208.

The coupling member 172 may further define a receptacle 228 at the second end 196. The receptacle 228 may be disposed concentrically around the through-bore 212 (e.g., around a portion of the through-bore 212, as shown) and/or around a second opening 232 of the through-bore 212 defined at the second end 196. The receptacle 228 may extend inwards into a body 236 of the coupling member 172 from the second end face 216 defined at the second end 196, as shown. In an assembly of the coupling member 172 with the hose 168, the end 188 of the hose 168 may be received into the receptacle 228 (e.g., in a press fitted manner) so as to have the hose 168 tightly crimped and/or fixedly coupled with the coupling member 172 (or with the second end 196 of the coupling member 172).

Although not limited, the coupling member 172 may be made from one or more of high grade plastics and/or polymers, or from a metallic material. For example, the coupling member 172 may be made from stainless steel, or from any suitable alloy, that may keep the coupling member 172 durable, free from rust and corrosion, and one which may provide the coupling member 172 with longevity.

The wiring harness 176 may be disposed or wrapped around the electrical wirings 156 and may keep the electrical wirings 156 together so as to route them together as a single pack or a single unit. In this regard, the wiring harness 176 may extend partially or fully along the length of the electrical wirings 156, and may be disposed in a manner so as to facilitate passage of the electrical connection 152 or the electrical wirings 156 through a common passageway (i.e., passageway 240 combinedly defined by the conduit 184 and the through-bore 212). In that manner, the wiring harness 176 may route the electrical connection 152 or the electrical wirings 156 through each of the hose 168 and the coupling member 172, and said passage of the electrical wirings 156 may facilitate establishment of electrical communication between the two or more sub-systems 108 (e.g., between the sensing system 124 and the control system 128) of the work machine 100.

The grommet 180 may be assembled and retentively engaged with the coupling member 172 and with the wiring harness 176 respectively with a first force and a second force. The first force may be greater than the second force facilitating a movement (see direction, A, FIG. 2) of the wiring harness 176 with respect to the grommet 180 without disengaging the grommet 180 from the coupling member 172. Both the first force and the second force may be frictional forces.

In some embodiments, the grommet 180 may define a first portion 244 (e.g., a first cylindrical portion 244') and a second portion 248 (e.g., a second cylindrical portion 248'). The first portion 244 may define a cross-sectional area larger than a cross-sectional area of the second portion 248. In that manner, a stepped surface 252 may be defined on the first portion 244, and which interfaces with the second portion 248. In an assembly of the grommet 180 with the coupling member 172 and the wiring harness 176, the second portion 248 of the grommet 180 may be inserted into the through-bore 212 through the first opening 220 and may be press-fitted against the inner coupling surface 224 of the through-bore 212, causing the grommet 180 to be retentively engaged with the coupling member 172 with the first force. In such an arrangement, the first portion 244 (or the stepped surface 252) may abut against the first end face 208 of the coupling member 172 so as to restrict an ingress of the grommet 180 into the through-bore 212 and so as to also retain the grommet 180 at the first end 192 of the coupling member 172.

Further, the grommet 180 may define a channel 256. The channel 256 may pass (e.g., linearly) through each of the first portion 244 and the second portion 248, as shown, and may provide passage to the wiring harness 176 (and thus the electrical connection 152) therethrough. The channel 256 may define an inner channel surface 260 that may lie in registration with the wiring harness 176 in the assembly of the grommet 180 with the wiring harness 176 (and with the coupling member 172). Such registration enables the grommet 180 to be retentively engaged with the wiring harness 176 with the second force. Although not limited, the grommet 180 may be made from a polymer that may exhibit flexible, elastic properties.

In some embodiments, the routing assembly 160 may include a sealing gel 264 disposed between at least a portion of the wiring harness 176 and at least a portion of the grommet 180. For example, the sealing gel 264 may be disposed between the inner channel surface 260 and an outer surface 268 defined by the wiring harness 176 so as to provide a sealing (e.g., a water-proof sealing) between the grommet 180 and the wiring harness 176. Said sealing may disallow entrance of any foreign or external elements, such as dust and other particles, into the passageway 240 defined by the through-bore 212 and the conduit 184 (to route the electrical connection 152 therethrough). As an example, the sealing gel 264 may include, but may not be limited to, one or more of a silicone based gel, an epoxy based gel, a phenolic sealant, an acrylic sealant, and/or may include any suitable polymer based sealant.

INDUSTRIAL APPLICABILITY

Referring to FIG. 3, an exemplary method for routing the electrical connection 152 between two or more sub-systems (e.g., between the sensing system 124 and the control system 128) of the work machine 100 is discussed. The method is described by way of a flowchart 300 and is discussed in conjunction with FIGS. 1 and 2. The method starts at step 302.

At step 302, an operator may provide and bring forth the hose 168 for the electrical wirings 156 so as to have the hose 168 serve as a protective sheath or cover for the electrical wirings 156 and/or for the electrical connection 152. As noted above, the hose 168 may include a hydraulic hose 168' that may be generally flexible, but may be rigid enough to withstand certain external forces (e.g., twisting and/or bending forces) that the hose 168 may be subjected to during an application of the routing assembly 160 and/or during an operation of the work machine 100. The method proceeds to step 304.

At step 304, the operator may provide and bring forth the coupling member 172 (as part of the overall, hose assembly 164) to be coupled with the hose 168. The method proceeds to step 306.

At step 306, the operator may couple the coupling member 172 with the hose 168 to form the hose assembly 164. More particularly, the operator may insert the end 188 of the hose 168 into the receptacle 228 defined at the second end 196 of the coupling member 172. In so doing, the operator fluidly couples the conduit 184 to the through-bore 212 so as to define the common passageway (i.e., the passageway 240 which is combinedly defined by the through-bore 212 and the conduit 184). In some embodiments, the end 188 of the hose 168 may be received into the receptacle 228 in a press-fitted fashion. It is possible for an operator to additionally or optionally apply securing means, such as adhesives, between the end 188 of the hose 168 and the second end 196 of the coupling member 172 so as to effectively retain the hose 168 with the coupling member 172. The method proceeds to step 308.

At step 308, the operator may use the wiring harness 176 to facilitate passage of the electrical wirings 156 through each of the conduit 184 and the through-bore 212 (i.e., through the passageway 240). In that manner, electrical communication between the two or more sub-systems 108 of the work machine 100 (e.g., the sensing system 124 and the control system 128) is enabled. In some embodiments, the wiring harness 176 may be first arranged or wrapped around the electrical connection 152 and/or may be arranged to bundle up the electrical wirings 156 as a single pack or single unit. Thereafter, the wiring harness 176 together with the electrical wirings 156 may be inserted into the passageway 240, e.g., through the first end 192 of the coupling member 172, passed into the through-bore 212 of the coupling member 172, and moved out through the second end 196 of the coupling member 172 so as to make the assembly of the wiring harness 176 together with the electrical wirings 156 advance further into the conduit 184 defined by the hose 168. Said procedure may continue until the wiring harness 176 together with the electrical wirings 156 may extend outwards of the hose 168 from the other end (not shown) of the hose 168. The method proceeds to step 310.

At step 310, the operator may apply the grommet 180 to retentively engage with the coupling member 172 and with the wiring harness 176 respectively with a first force and a second force. The first force being greater than the second force, as already discussed above, facilitates a movement of the wiring harness 176 (and thus the electrical connection 152/electrical wirings 156) with respect to the grommet 180 without disengaging the grommet 180 from the coupling member 172. The method ends at step 310.

In some embodiments, the grommet 180 may be mounted onto the assembly of the wiring harness 176 and the electrical wirings 156 prior to the insertion of said assembly of the wiring harness 176 and the electrical wirings 156 into the passageway 240. More particularly, the operator may slide and insert said assembly of the wiring harness 176 and the electrical wirings 156 into the channel 256 of the grommet 180 so as to bring the inner channel surface 260 of the channel 256 into registration with the wiring harness 176.

Such a registration of the inner channel surface 260 with the wiring harness 176 enables the grommet 180 to be retentively engaged with the wiring harness 176 with the second force, which may be a frictional force.

Once the grommet 180 is mounted to said assembly of the wiring harness 176 and the electrical wirings 156, the operator may push said assembly of the wiring harness 176 and the electrical wirings 156 further inwards into the passageway 240 until said assembly (or solely the electrical wirings 156 of said assembly) is drawn to extend outwards of the passageway 240 through the other end (not shown) of the hose 168. In so doing, the operator may also bring the grommet 180 in contact with the first end 192 of the coupling member 172 such that the second portion 248 of the grommet 180 may be able to enter into the through-bore 212 first.

Once the grommet 180 is in contact with the coupling member 172, the operator may push and insert the second portion 248 of the grommet 180 into the through-bore 212 through the first opening 220 of the through-bore 212 such that the second portion 248 may be press-fitted against the inner coupling surface 224 of the through-bore 212. This enables the grommet 180 to be retentively engaged with the coupling member 172 with the first force, which may be a frictional force. The operator may then keep pushing the grommet 180 into the through-bore 212 until the first portion 244 (or the stepped surface 252) of the grommet 180 is brought into abutment against the first end face 208 of the coupling member 172 so as to restrict further ingress of the grommet 180 into the through-bore 212 and so as to also retain the grommet 180 at the first end 192 of the coupling member 172.

In some embodiments, the operator may also provide the sealing gel 264 between at least a portion of the wiring harness 176 and at least a portion of the grommet 180. In this regard, the sealing gel 264 may be injected (by a suitable device) and introduced into an interface defined between the inner channel surface 260 of the channel 256 and the outer surface 268 of the wiring harness 176. The sealing gel 264 may have the property to be relatively stretchable and thus may be able to accommodate movements of the wiring harness 176 with respect to the grommet 180, but may also have the property to relatively easily entirely disintegrate if a full disassembly and removal of the wiring harness 176 from the grommet 180 were required.

In brevity, the electrical connection 152, by way of the routing assembly 160, is suitably routed through a protective sheath or a cover (i.e., through the hose 168 or the hose assembly 164) that protects the electrical connection 152 from the harsh elements of the terrain or the worksite 144 in which the work machine 100 may operate. Further, the first force being greater than the second force, facilitating a movement of the wiring harness 176 with respect to the grommet 180 without disengaging the grommet 180 from the coupling member 172, allows the wiring harness 176 and/or the electrical connection 152 passing through the hose assembly 164 (or the passageway 240) to move with respect to the hose 168 and hose assembly 164 as flexures or bending forces are induced in the hose 168 or in the hose assembly 164, during operations. In that manner, the wiring harness 176 and/or the electrical connection 152 is prevented from being subjected to undue tension and strain, in turn increasing the useful, operable life of the wiring harness 176 and the electrical wirings 156.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A routing assembly for routing an electrical connection between two or more sub-systems in a work machine, the routing assembly comprising:
    a hose defining a conduit;
    a coupling member defining a through-bore fluidly coupled with the conduit;
    a wiring harness facilitating passage of one or more electrical wirings through each of the conduit and the through-bore to enable electrical communication between the two or more sub-systems; and
    a grommet retentively engaged with the coupling member and the wiring harness respectively with a first force and a second force,
        wherein the first force is greater than the second force facilitating a movement of the wiring harness with respect to the grommet without disengaging the grommet from the coupling member, and
        wherein the first force, that prevents disengaging the grommet from the coupling member, is based on a press-fit between an inner coupling surface of the through-bore and a portion of the grommet, without an external force being applied to the grommet.

2. The routing assembly of claim 1, wherein the first force and the second force are frictional forces.

3. The routing assembly of claim 1, wherein the grommet defines a first portion and a second portion, the first portion defining a cross-sectional area larger than a cross-sectional area of the second portion.

4. The routing assembly of claim 3, wherein
    the coupling member defines an end face, the through-bore being open to the end face at a first opening and defining the inner coupling surface extending from the end face, and
    the second portion of the grommet is inserted into the through-bore through the first opening and press-fitted against the inner coupling surface, causing the grommet to be retentively engaged with the coupling member with the first force.

5. The routing assembly of claim 4, wherein the first portion abuts against the end face to retain the grommet at a first end of the coupling member.

6. The routing assembly of claim 1, wherein the grommet defines a channel to provide passage to the wiring harness therethrough, the channel defining an inner channel surface lying in registration with the wiring harness, enabling the grommet to be retentively engaged with the wiring harness with the second force.

7. The routing assembly of claim 1 further comprising a sealing gel disposed between at least a portion of the wiring harness and at least a portion of the grommet.

8. The routing assembly of claim 1, wherein the coupling member defines a receptacle at an end of the coupling member, wherein the receptacle is separate from an opening of the through-bore defined in the end, and wherein an end portion of the hose is received into the receptacle.

9. A work machine, comprising:
    a plurality of sub-systems;

a routing assembly for routing an electrical connection between two or more sub-systems of the plurality of sub-systems, the routing assembly including:
- a hose defining a conduit;
- a coupling member defining a through-bore fluidly coupled with the conduit;
- a wiring harness facilitating passage of one or more electrical wirings through each of the conduit and the through-bore to enable electrical communication between the two or more sub-systems,
  - wherein the wiring harness consists of a single unit, defining an outer surface, that includes the one or more electrical wirings; and
- a grommet retentively engaged with the coupling member and the wiring harness respectively with a first force and a second force,
  - wherein the first force is greater than the second force facilitating a movement of the wiring harness with respect to the grommet without disengaging the grommet from the coupling member, and
  - wherein the second force, that allows movement of the wiring harness with respect to the grommet, is based on friction at an interface defined between a channel of the grommet and the outer surface of the wiring harness.

10. The work machine of claim 9, wherein the first force and the second force are frictional forces.

11. The work machine of claim 9, wherein the grommet defines a first portion and a second portion, the first portion defining a cross-sectional area larger than a cross-sectional area of the second portion.

12. The work machine of claim 11, wherein
the coupling member defines an end face, the through-bore being open to the end face at a first opening and defining an inner coupling surface extending from the end face, and
the second portion of the grommet is inserted into the through-bore through the first opening and press-fitted against the inner coupling surface, causing the grommet to be retentively engaged with the coupling member with the first force.

13. The work machine of claim 12, wherein the first portion abuts against the end face to retain the grommet at a first end of the coupling member.

14. The work machine of claim 9, wherein the wiring harness is disposed through the channel of the grommet, and wherein the interface includes an inner channel surface of the grommet.

15. The work machine of claim 9 further comprising a sealing gel disposed between at least a portion the wiring harness and at least a portion of the grommet.

16. The work machine of claim 9, wherein the coupling member defines a receptacle, and the hose defines an end received into the receptacle to be fixedly coupled with the coupling member.

17. A method for routing an electrical connection between two or more sub-systems in a work machine, the method comprising:
providing a hose defining a conduit;
providing a coupling member defining a through-bore,
  wherein the coupling member defines a receptacle at a first end of the coupling member, and
  wherein the receptacle is separate from an opening of the through-bore defined in the first end;
connecting the hose to the coupling member, by inserting an end portion of the hose into the receptacle, such that the conduit is fluidly coupled to the through-bore;
using a wiring harness to facilitate passage of one or more electrical wirings through each of the conduit and the through-bore to enable electrical communication between the two or more sub-systems; and
applying a grommet, at a second end of the coupling member, to retentively engage with the coupling member and with the wiring harness respectively with a first force and a second force,
  wherein the first force is greater than the second force facilitating a movement of the wiring harness with respect to the grommet without disengaging the grommet from the coupling member.

18. The method of claim 17 further comprising providing a sealing gel between at least a portion of the wiring harness and at least a portion of the grommet.

19. The method of claim 17, wherein the grommet defines a first portion and a second portion, the first portion defining a cross-sectional area larger than a cross-sectional area of the second portion, the coupling member defines an end face at the second end, the through-bore being open to the end face at a first opening and defining an inner coupling surface extending from the end face, wherein applying the grommet includes:
inserting the second portion of the grommet into the through-bore through the first opening and press-fitting the second portion against the inner coupling surface, enabling the grommet to be retentively engaged with the coupling member with the first force, and
bringing the first portion into abutment against the end face to retain the grommet at a first end of the coupling member.

20. The method of claim 17, wherein the grommet defines a channel to provide passage to the wiring harness therethrough, the channel defining an inner channel surface, wherein applying the grommet includes:
bringing the inner channel surface into registration with the wiring harness, enabling the grommet to be retentively engaged with the wiring harness with the second force.

* * * * *